United States Patent [19]
Cox

[11] 3,888,367
[45] June 10, 1975

[54] BOAT TRAILER

[76] Inventor: William F. Cox, P.O. Box 338, Grifton, N.C. 28530

[22] Filed: Sept. 3, 1974

[21] Appl. No.: 502,679

[52] U.S. Cl. .............................. 214/84; 280/414 R
[51] Int. Cl. ................................................ B60p 3/10
[58] Field of Search ...................... 280/414; 214/84

[56] References Cited
UNITED STATES PATENTS

| | | | |
|---|---|---|---|
| 3,104,770 | 9/1963 | Calkins et al. | 214/84 |
| 3,155,249 | 11/1964 | Johnson | 214/84 |
| 3,512,667 | 5/1970 | Calkins | 214/84 |
| 3,756,439 | 9/1973 | Johnson | 214/84 |
| 3,785,677 | 1/1974 | Calkins | 280/414 R |
| 3,812,986 | 5/1974 | Rogers | 214/84 |

Primary Examiner—Leo Friaglia

[57] ABSTRACT

A boat trailer comprises a plurality of transversely pivotally mounted frames, and each frame has a plurality of roller assemblies mounted on the ends of its side frame members, each assembly being pivotally mounted on said frame on a longitudinal axis, a plurality of rollers are pivotally mounted on a transverse axis on said auxiliary frame, and each roller has a substantially universal mounting on its axis so that the weight of the boat is evenly distributed among the rollers and each roller adjusts itself to present the largest surface of contact to the hull.

7 Claims, 9 Drawing Figures

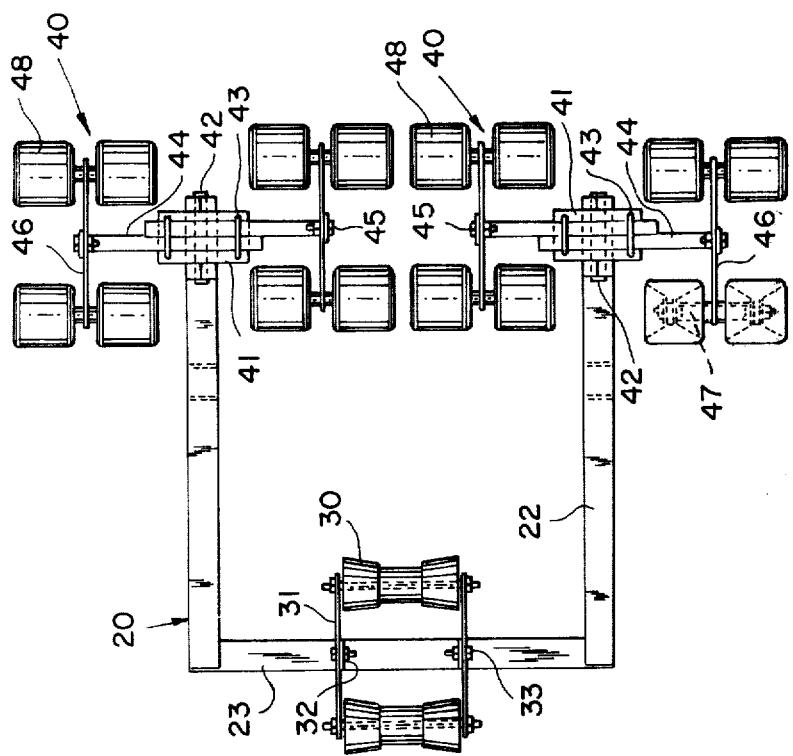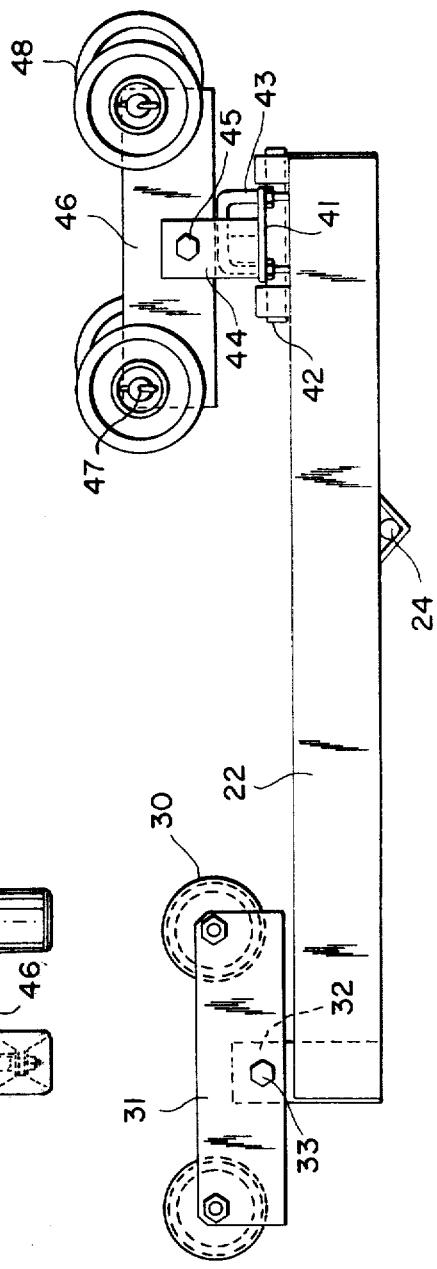

BOAT TRAILER

This invention relates to a boat trailer for transporting boats and for launching and recovering boats in the water.

Many types of boat trailers are known, including simple trailers which may be backed into the water and carry light boats, and trailers with various forms of pivotal supporting frames for handling heavy boats, these frames being mounted on the main frame or on other members which are themselves pivotally mounted on the main frame. The boat may be supported on various cushion members or roller assemblies, to make launching and hauling of the boat easier, and to cushion the support of the boat for travel on the highway when towed by a vehicle.

Applicant's improvement resides in supporting a boat on a plurality of pivoted frames which carry assemblies of rollers to support the boat, the weight of the boat being distributed between the frames, the assemblies of rollers automatically adjusting to the weight on each frame, and each roller being so mounted as to adjust to present a surface contact with the hull of the boat. The rollers on each frame include a front keel roll or rolls and a pair of roller assemblies so that they provide a line of rollers extending transversely of the boat, the weight being supported on the rollers in a line across the hull from the keel to the sides. This substantially continuous support across the boat is especially necessary at the stern of the boat, since frequently heavy, outboard motors are carried on the transom, while the surface contact of the rollers with the hull provides broad supporting areas and avoids the concentration of excessive pressure at certain points.

For large boats either one or two pairs of the pivotal frames may be pivotally mounted on the ends of rocker beams, which are also pivotally mounted intermediate their ends on the main frame of the trailer, so that the weight is substantially divided between the two frames of a pair. The rocker beams are allowed only small angular movement by stops limiting the pivotal movement, thereby avoiding excessive rocking on the frames. In this type of supporting assemblies, the main frame may carry a forward keel roll for supporting the bow, this central keel roll being mounted for vertical adjustment to sustain a certain amount of weight and also the distribution of the weight on the several pivoted frames.

In the drawings:

FIG. 3 is a top plan view of one of the pivoted frames with the roller assemblies thereon.

FIG. 4 is a side elevation of the pivoted frame of FIG. 3.

Figure 1:
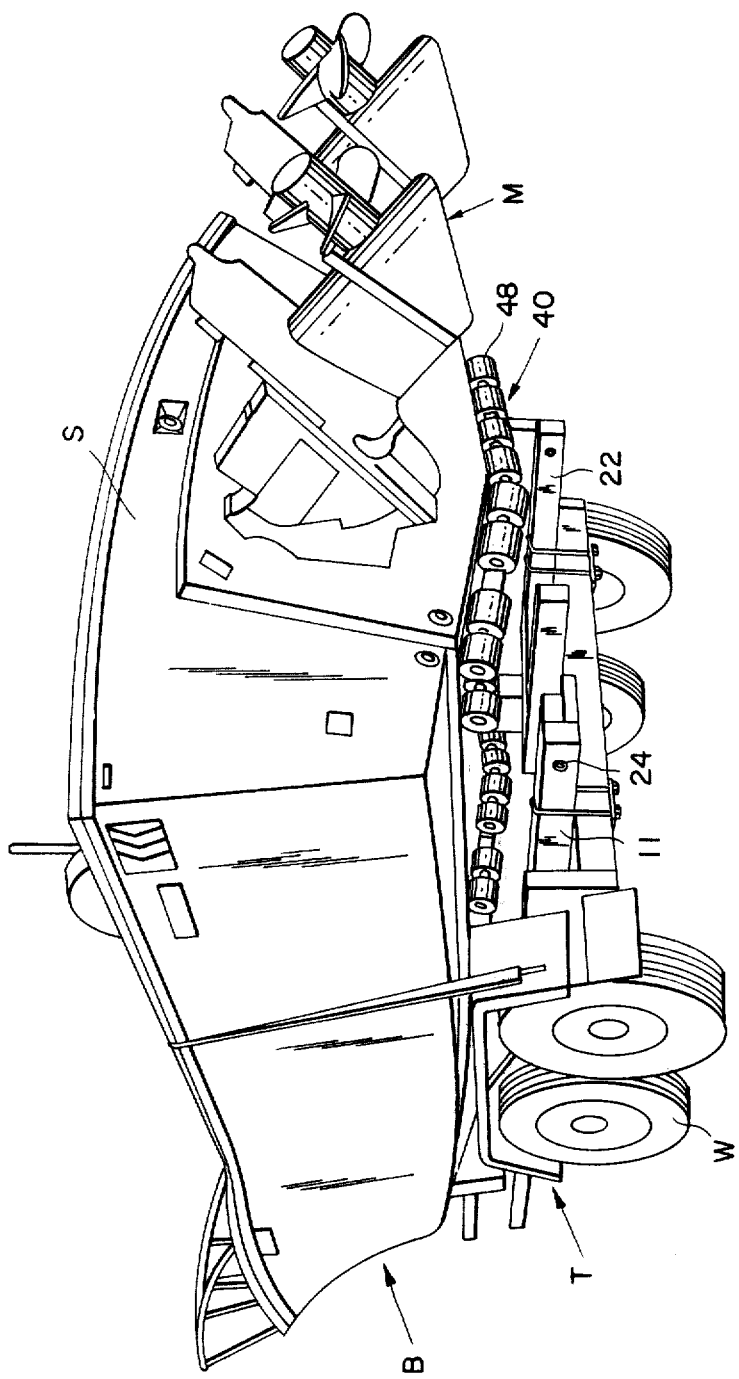
FIG. 1 is a perspective view showing the trailer of this invention with a boat thereon.

The trailer T, carrying a boat B, is shown in FIG. 1, with the outboard motors M or other drive mechanism mounted on the transom S. The boat is supported on the trailer by the rollers which are arranged as shown in FIGS. 2 to 5, the weight of the boat being distributed on the rollers as seen in FIG. 1, especially at the transom, which is directly supported on rollers underlying the keel and extending outwardly toward the sides. The stern view of the boat shows how the transom is supported by the series of underlying rollers.

Figure 2:
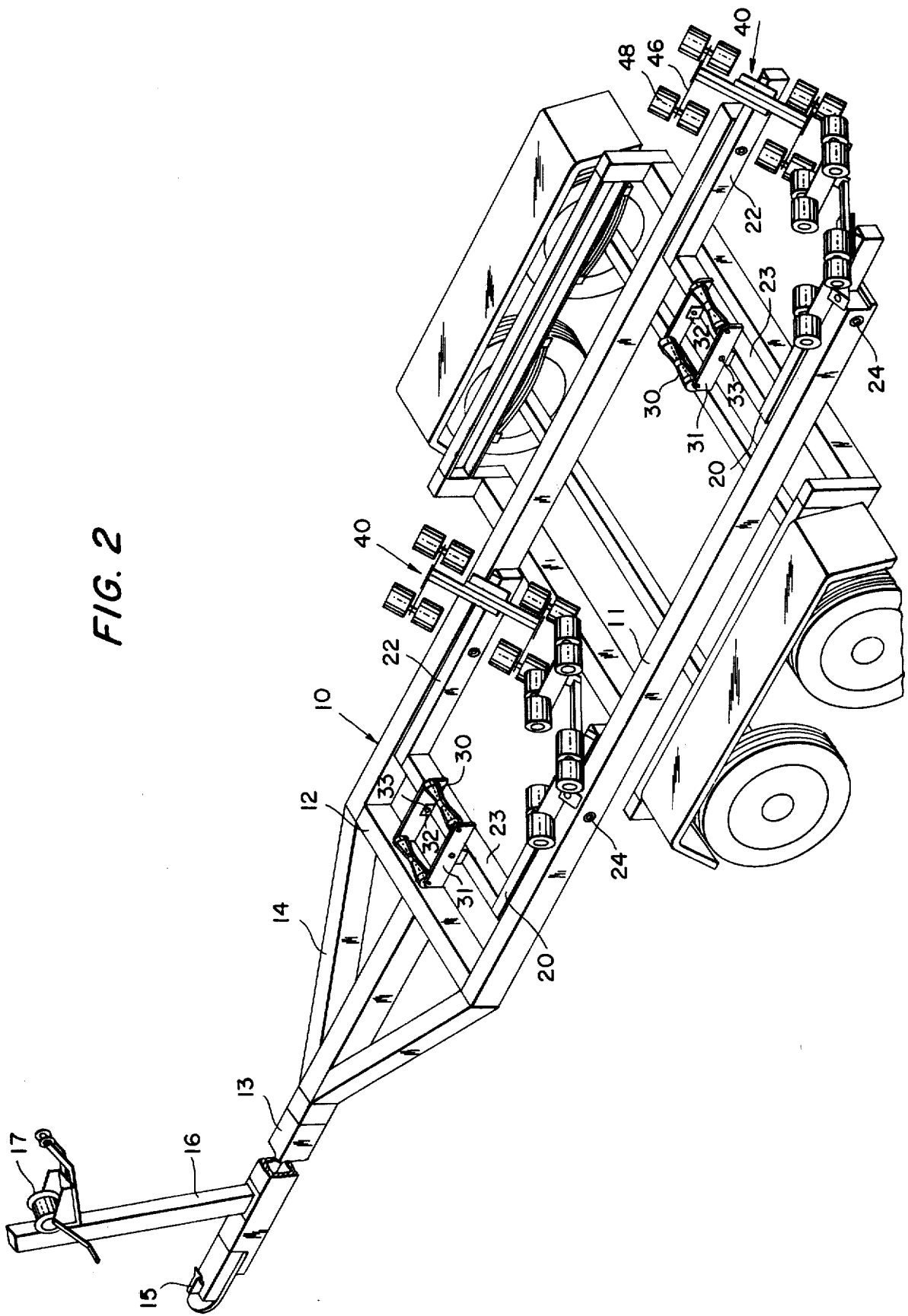
FIG. 2 is the principal form of the trailer in perspective.

The trailer itself is shown in FIG. 2, in which the main frame 10 is carried by wheels W. The side members 11 of the frame are connected at their forward ends by a transverse member 12, and a tongue 13 braced by members 14 extends forwardly and carries an attachment 15 for connection to a towing vehicle. Near the forward end, a post 16 projects upwardly with a reel 17 mounted thereon for drawing forward a boat to be mounted on the trailer.

The boat is supported on the main frame 10 by rollers carried on auxiliary frames 20 pivoted on the main frame side members 11, the rollers on each auxiliary frame being mounted to distribute the weight on the rollers by surface contact of the boat hull with the rollers, regardless of the shape and curvature of the hull. The two auxiliary frames 20 are constituted by longitudinal side members 22 connected at their forward ends by a transverse member 23. The forward auxiliary frame 20 is pivoted to the side beams on axles 24 passing through the side members forward of their rear ends and through the side beams of the main frame. The rear auxiliary frame 20 is pivoted on the side members of the main frame adjacent its rear end, the axles passing through the auxiliary frame side members forward of their rear ends and through the side members of the main frame.

On the transverse member 23 of each auxiliary frame, a keel roll 30 or rolls is mounted, in this example shown as a pair of rolls 30 carried on the opposite ends of a pair of longitudinal plates 31. Brackets 32 pivotally support these plates on transverse axes 33, so that the weight will be equally carried by the two rolls.

On the rearward end of each of the side members 22, a roller assembly 40 is mounted with pivotal movement in two directions to distribute the weight equally on all rollers, while at the same time distributing the points of support entirely across the hull from the keel outwardly.

As can be seen in FIGS. 3 and 4, a plate or support member 41 is pivoted on the side member 22 on a longitudinal axis at 42. Fixed on plate 41 at 43 are transverse arms 44 extending on opposite sides of side member 22, to which on transverse axes 45 are pivoted plates 46, each plate having dual stub axles 47 on its opposite ends with rollers 48 mounted on the opposite ends of each stub axle. The arms 44 are shown as separate inboard and outboard elements clamped to plate 41 by the U-shaped bolts 43 so that they may be adjusted on the plate 41 to vary the spacing of the rollers mounted on the plate.

For mounting the stub axles, each plate 46 has an opening 46a in each end, through which passes a reduced portion 47a of the dual stub axle 47, the reduced portion being substantially longer than the thickness of the plate and the opening being larger than the reduced portion 47a, to provide limited universal movement of the dual stub axle 47 on the plate 46. One or both enlarged portions on the stub axle may be formed separately and secured on the axle, for assembly on the plate.

Figure 5:
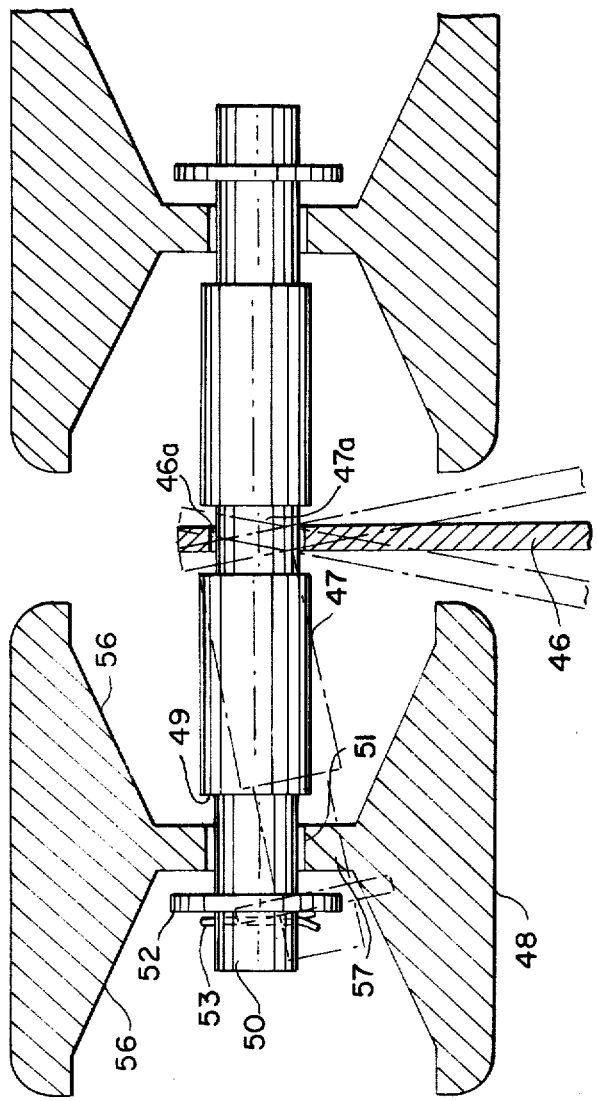
FIG. 5 is an axial cross section through a stub axle and its mounting, with the rollers on the ends.

The ends of each dual stub axle carry rollers 48, which are mounted for universal movement on the stub axle, so as to provide for surface engagement of the roller with the hull. For this purpose, the stub axle 47 carried by the plate 46 is formed at each end with a shoulder 49 spaced from its end, the reduced end 50 beyond the shoulder passing through the opening 51 in the roller 48 and carrying a washer 52 retained by a cotter pin 53. Each roller 48, as shown in the cross section, is formed with a wide periphery or tread portion 55. Inwardly from its periphery, the sides 56 converge inwardly toward a central plane through a narrow web or disk 57, having the opening 51 receiving the reduced end of the stem. This opening is substantially larger than the diameter of the reduced stem 50 to allow the roller to be canted on the stem, as shown in FIG. 5, but sufficiently small to be retained between the washer 52 and shoulder 49.

Boat hulls are constructed of many different contours, so that the configuration of the surface to be engaged by the supporting rollers cannot be foreseen. The assembly 40 of the rollers shown in FIGS. 2 to 4 will, by means of the pivotal movements about the orthogonal axes 42 and 45, the limited universal movements of the stub axles 47, and the universal or "wobbly" movements of rollers 48 on the stub axles 47, conform to any possible curvature of the hull. Thus, the eight rollers of each assembly will engage a hull regardless of contour with equal unit area pressures on all rollers, as a result of the provision for complete universal movements of the rollers and their mountings.

The weight on each auxiliary frame 20 is distributed on the keel rolls 30 and the roller assemblies 40 according to the position of the axles 24 for the frame. The rolls of the assemblies 40 on the rear ends of each auxiliary frame extend from the keel outwardly to provide substantially a uniform, continuous line of support across the bottom, as well illustrated at the transom in FIG. 1. This broad support is especially important at this location, because of the severe strains resulting from the mounting of heavy, outboard motors M on the transom S.

Figure 6:
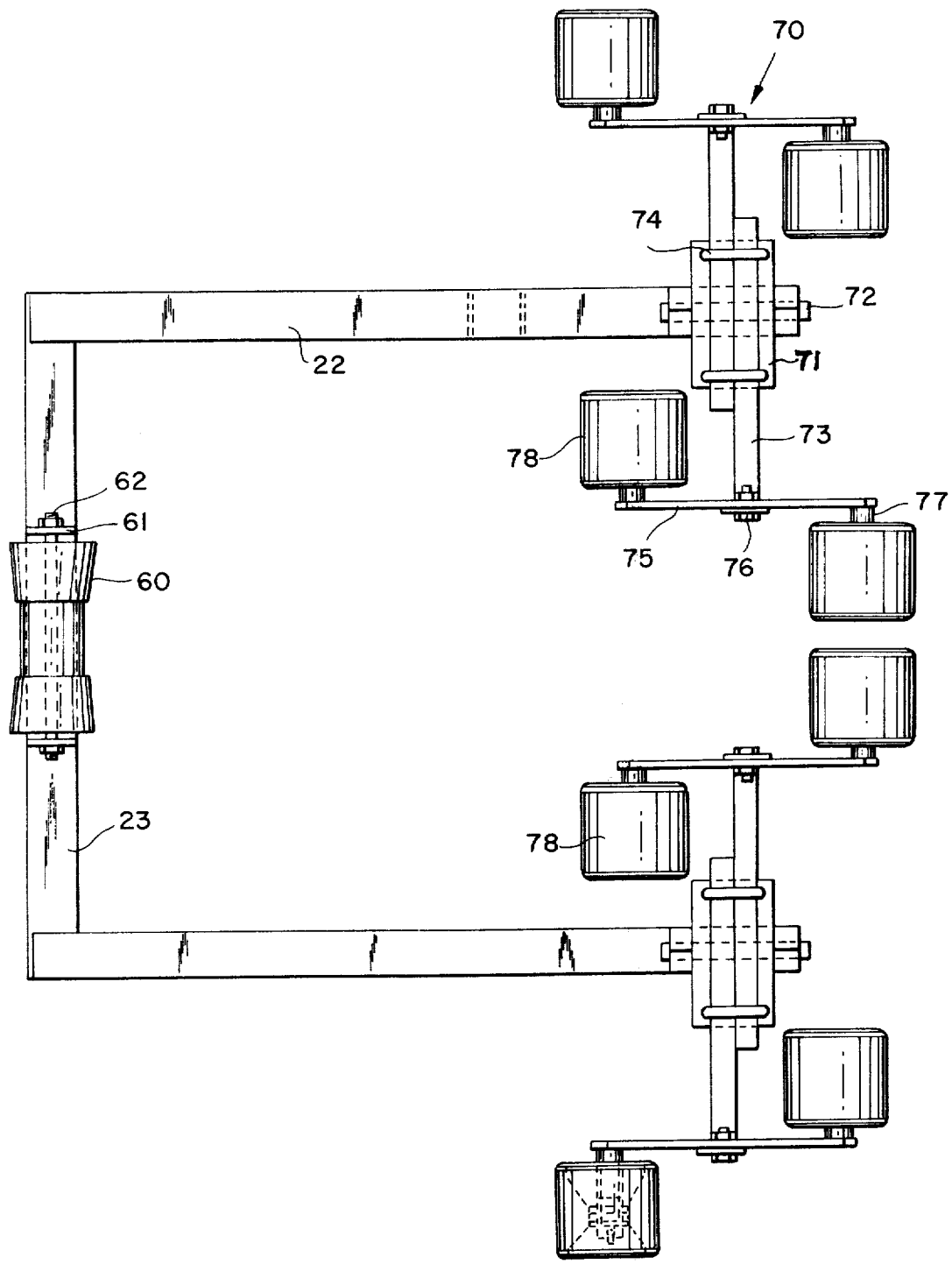
FIG. 6 is a view of another form of pivoted frame with a slightly modified roller assembly.

A modified form of roller assembly 70, as shown in FIG. 6, may be used for light boats, each assembly having only four rollers 78. Each assembly includes a support 71 pivoted on a longitudinal axis 72 and provided with transverse arms fixed to the support 71 at 74. Each arm 73 carries a longitudinal plate 75 pivoted on a transverse axis 76 and carrying single axles 77 on its ends. The single axle on each end of the plate 75 carries a single roller 78, mounted as shown in FIG. 5. The four rollers adjust to conform to the surface of a hull in the same manner as the eight rollers in FIG. 3. This frame in FIG. 6 also carries only a single keel roll 60 on its forward end, this roll being carried by flanges 61 on an axle 62.

Figure 7:
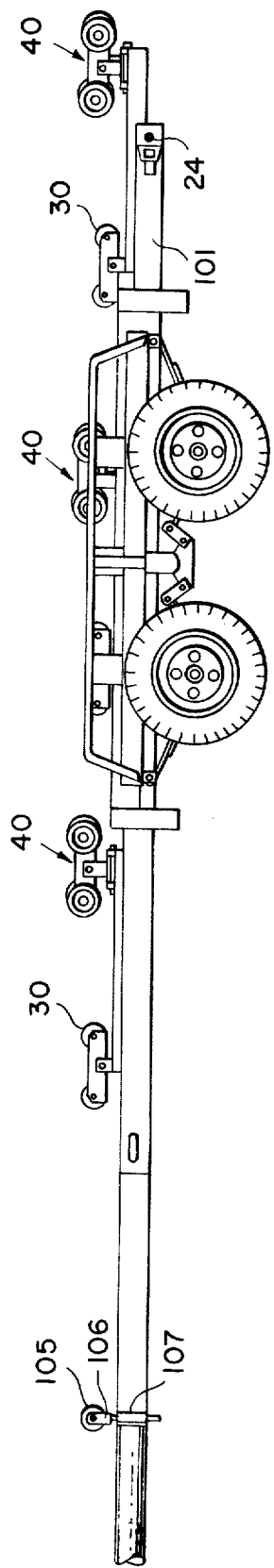
FIG. 7 is a side view of another form of the invention.
Figure 8:
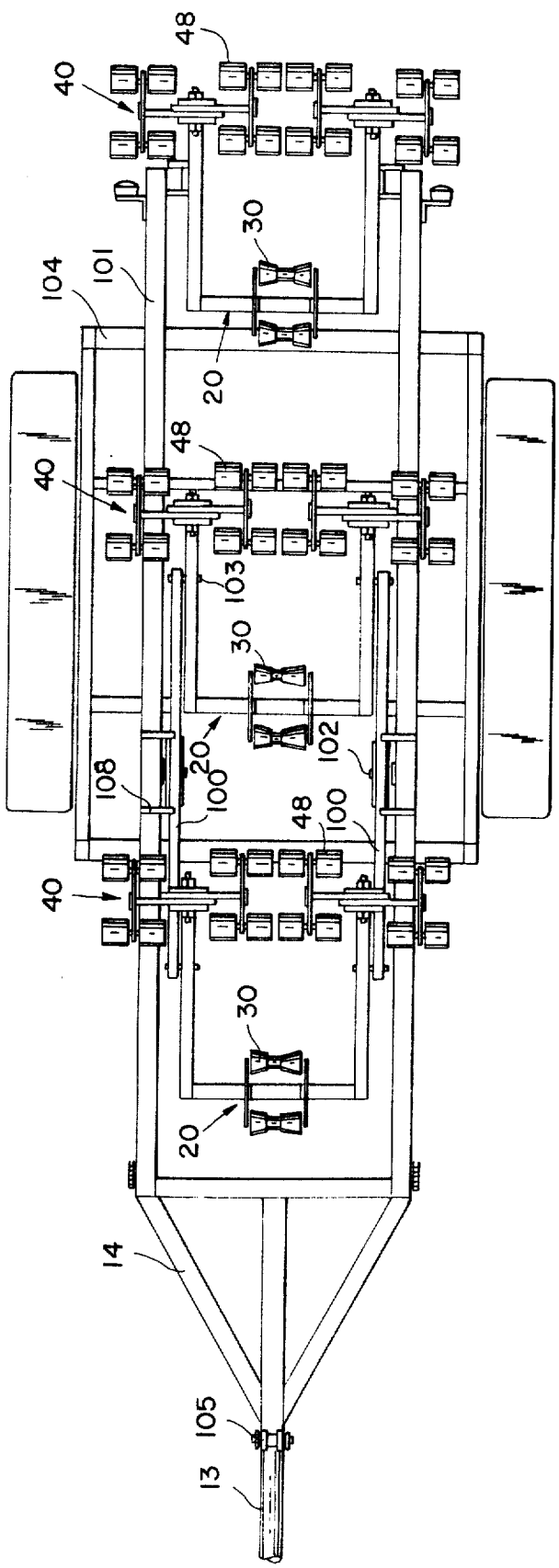
FIG. 8 is a top plan view of the form shown in FIG. 7.

For large boats, it is necessary to provide several longitudinally spaced assemblies to distribute better the support of the hull. FIGS. 7 and 8 show three longitudinally spaced pairs of such assemblies 40 carried on pivotally mounted frames 20 so mounted as to distribute the weight. For this purpose, the forward and intermediate frames 20 are pivotally mounted on the opposite ends of rocker beams 100 on axles 103. The rocker beams 100 are pivoted intermediate their ends on the main side frame members 101 by axles 102, so that the two auxiliary frames 20 will carry substantially equal weight. The third auxiliary frame 20 is pivoted on the rear ends of the main side frame members 101 at 24, as in FIGS. 1 and 2. The main frame side members 101 are carried by a cradle 104, which may be adjustable fore and aft on the wheels and axle.

Each rocker beam 100 pivoted on an axle 102 has pivotal movement to balance the weight on auxiliary frames 20. This angular movement of beams 100 is limited by stops 108 fixed on the main side frames 101 and overlying the rocker beams 100 in spaced relation.

An adjustable keel roll 105 is carried by the tongue 13 of the main frame. This roll is mounted on a bracket 106, which has a stem fastened to the tongue at 107 for vertical adjustment by any conventional adjustable means. This roll may be raised or lowered to distribute the weight more evenly on the several auxiliary frame assemblies and to stabilize a boat carried on the pivoted frames.

Figure 9:
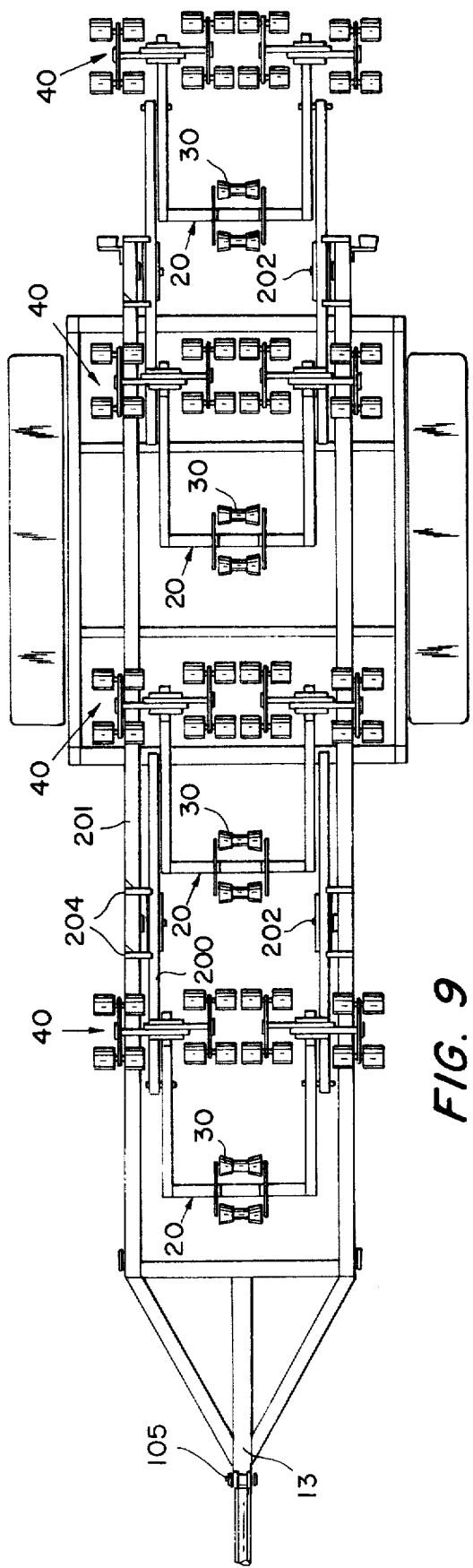
FIG. 9 is a top plan view of a trailer having a plurality of rocker beams with auxiliary frames pivoted thereon.

For still larger boats, as shown in FIG. 9, two sets of dual assemblies may be used, in which a pair of rocker beams 200 are pivoted on the rear ends of main frame side members 201, and another dual assembly on a pair of rocker beams 200 at the forward end of the main frame. Each dual rocker beam assembly is similar to that shown in FIGS. 7 and 8, axles 202 supported in the main frame side members and stops 204 on opposite sides of the axles overlying each rocker beam and limiting its angular movement. The vertically adjustable keel roll 105 may be utilized to support the bow and distribute the weight more evenly, as in the form shown in FIGS. 7 and 8.

I claim:

1. In a boat trailer, a wheel-carried main frame having a forward tongue with means for connecting to a towing vehicle, and means for supporting a boat on said main frame comprising an auxiliary frame pivoted on said main frame adjacent its rear end, a central keel roll on the front end of said auxiliary frame and a plurality of roller assemblies on the rear end of said auxiliary frame, one of said assemblies being pivotally mounted on a longitudinal axis on each side at the rear end of said auxiliary frame, each of said assemblies having transverse arms pivoted on said auxiliary frame on said longitudinal axis, a longitudinal member pivoted at an intermediate part on the end of each transverse arm on a transverse axis, a pair of transversely spaced resilient rollers rotatable on each end of each said longitudinal member, each of said rollers being mounted on a transverse axle with substantial play between said roller and axle to provide universal movement of said roller on said axle, the transverse and longitudinal pivotal axes of each assembly providing for universal movement of the assembly so that all eight rollers of each assembly will engage a boat hull supported thereon, the universal mounting of the individual rollers providing substantially surface contact with the hull along the circumference of the rollers, the axes of the rearward rollers lying approximately in a vertical plane so as to underlie a boat hull adjacent the transom from the keel to the outermost rollers and provide support for said transom, including an outboard motor if carried by the transom.

2. In a roller assembly for supporting a boat hull on a frame member, a support member pivotally mounted on said frame member on a longitudinal axis, a pair of arms transverse to said longitudinal axis fixed on said support member extending on opposite sides of said support member and said axis, a longitudinal plate pivotally mounted on the end of each arm on a transverse axis and stub axles pivotally mounted on the ends of each plate, and a roller of elastomeric material on each stub axle, said roller being mounted on said stub axle with an axial opening substantially larger than said stub axle to allow universal movement of said roller on said stub axle.

3. In a roller assembly as claimed in claim 2, in which each plate carries a pair of stub axles on each end and a roller on each stub axle, so that said assembly includes eight supporting rollers.

4. In a roller assembly as claimed in claim 2, in which said two arms are separate members, which are adjustably mounted on said support member, so that they may be adjusted transversely of said longitudinal axis to vary the transverse spacing of the rollers carried on the plates on their ends.

5. In a boat trailer having a main frame comprising a pair of transversely spaced, longitudinally extending side frame members, means to support a boat on said main frame comprising a pair of rocker beams pivotally mounted on an axis intermediate their ends on said side frame members, a pair of stop members fixed to said main frame and overlying each rocker beam on opposite sides of said pivot to limit angular movement, a pair of auxiliary frames pivotally mounted on opposite ends of said pair of rocker beams, each of said auxiliary frames comprising transversely spaced, longitudinal side members connected at their forward ends by a transverse member, said side members being pivoted intermediate their ends on the ends of said rocker beams, at least one keel roll centrally mounted on said transverse member of each auxiliary frame, and roller assemblies pivotally mounted on the rear ends of the side members of each auxiliary frame, each said roller assembly comprising a support member pivotally mounted on the rear end of one of said side members on a longitudinal axis, a pair of arms transverse to said longitudinal axis fixed on said support member and extending on opposite sides of said support member, a longitudinal plate pivotally mounted on the end of each arm on a transverse axis and carrying a pair of stub axles on its ends, a roller of elastomeric material on each stub axle, each said roller being mounted on its stub axle with an axial opening substantially larger than said stub axle to allow universal movement of said roller on said stub axle, and a vertically adjustable central keel roll mounted on said main frame forward of said pivoted auxiliary frames to provide additional support for the bow of a boat and to stabilize a boat carried on said pivoted frames.

6. In a roller supporting structure, a stub axle having a shoulder spaced from its outer end and a reduced end portion, and a roller of elastomeric material mounted on said reduced end, said roller having a broad peripheral portion, side walls converging inwardly toward the axis of said roller to a narrow, central disc portion, said central portion having an opening through which said reduced end portion passes, said opening being substantially larger in diameter than said reduced end but of less diameter than said shoulder, so that said roller may be inclined substantially to the axis of said axle, and means on the outer end of said axle including a circular member of larger diameter than said opening to retain said roller on said stub axle.

7. In a roller assembly for supporting a boat hull on a frame member, a support member pivotally mounted on said frame member on a longitudinal axis, a pair of arms transverse to said longitudinal axis fixed on said support member extending on opposite sides of said support member, a longitudinal plate pivotally mounted on the end of each arm on a transverse axis and carrying stub axles on its ends, each stub axle being mounted on an end of said plate with limited universal angular movement in all directions, and a roller of elastomeric material on each stub axle, said roller being mounted on said stub axle with an axial opening substantially larger than said stub axle to allow universal movement of said roller on said stub axle.

* * * * *